(12) United States Patent
Hara

(10) Patent No.: US 6,661,482 B2
(45) Date of Patent: Dec. 9, 2003

(54) POLARIZING ELEMENT, OPTICAL ELEMENT, AND LIQUID CRYSTAL DISPLAY

(75) Inventor: Kazutaka Hara, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/972,029

(22) Filed: Oct. 5, 2001

(65) Prior Publication Data
US 2003/0067582 A1 Apr. 10, 2003

(51) Int. Cl.$^7$ ............................................. G02F 1/1335
(52) U.S. Cl. ............................ 349/96; 349/98; 349/113
(58) Field of Search ........................ 349/96, 98, 69–71, 349/117, 112–113, 9, 64, 115

(56) References Cited

U.S. PATENT DOCUMENTS

| | | | |
|---|---|---|---|
| 5,486,935 A | 1/1996 | Kalmanash | 359/37 |
| 5,828,488 A | * 10/1998 | Ouderkirk et al. | 359/487 |
| 6,507,380 B1 | * 1/2003 | Iijima | 349/96 |

* cited by examiner

*Primary Examiner*—Jey Tsai
(74) *Attorney, Agent, or Firm*—Westerman, Hattori, Daniels & Adrian LLP

(57) ABSTRACT

A polarizing element and an optical element are provided that can form a semitransparent or other type of liquid crystal display which is excellent in contrast in a reflective display mode and also is excellent in luminance in a transmissive display mode utilizing a reflective polarizing plate. A polarizing element comprising a reflective polarizing plate and an absorptive polarizer, wherein the reflective polarizing plate separates an incident natural light into a reflected light and a transmitted light each comprising a polarized light, and the absorptive polarizer is arranged on one side of the reflective polarizing plate so as to transmit a polarized light comprising the transmitted light. Also, an optical element comprising this polarizing element; and (a) a quarter wavelength plate or (b) an absorptive polarizing plate and a quarter wavelength plate arranged on the side of the absorptive polarizer in the polarizing element, wherein the absorptive polarizing plate has an axial relation so as to transmit a polarized light transmitted through the absorptive polarizer. While accomplishing the function as a semitransparent reflective polarizer utilizing the reflective polarizing plate, in a transmissive display mode, high luminance display can be achieved with high contrast, and in a reflective display mode, unnecessary reflected light (returned light) of an external light can be absorbed and cut off efficiently.

26 Claims, 3 Drawing Sheets

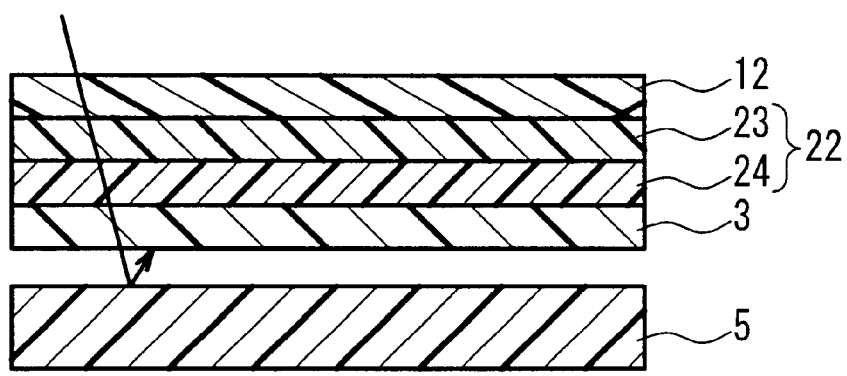
F I G. 5
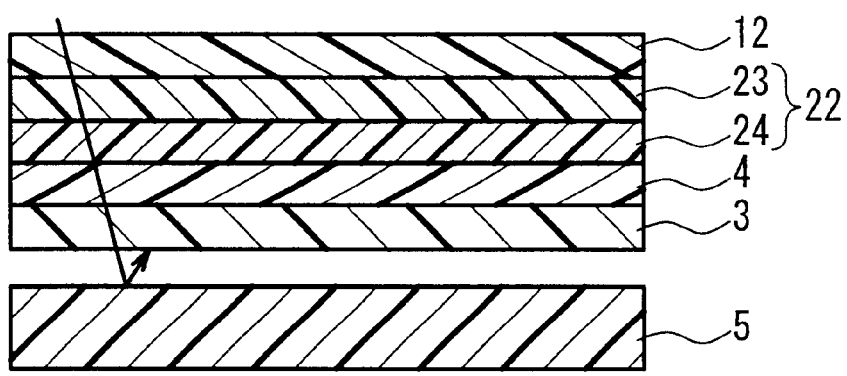
F I G. 6

POLARIZING ELEMENT, OPTICAL ELEMENT, AND LIQUID CRYSTAL DISPLAY

FIELD OF THE INVENTION

The present invention relates to a polarizing element and an optical element that can prevent reduced contrast due to unnecessary reflected light and are suitable for forming a semitransparent liquid crystal display etc., and a semitransparent liquid crystal display using these elements.

DESCRIPTION OF THE PRIOR ART

Conventionally, when a reflective or semitransparent liquid crystal display is formed using a reflective polarizing plate that separates an incident natural light into a reflected light and a transmitted light each comprising a polarized light, a light transmitted through the reflective polarizing plate is reflected by the face of a lower layer, etc. and becomes unnecessary returned light. This decreases the level of a black display, resulting in reduced contrast. To prevent this, it has been known to provide a light-absorbing layer on the lower side of the reflective polarizing plate.

In a semitransparent liquid crystal display, however, the light-absorbing layer needs to have a light transmission property so that the visibility in a transmissive display mode through a lighting device is ensured. Thus, in the above-mentioned light-absorbing layer system, it has been difficult to prevent reduced contrast in a black display etc. in a reflective display mode.

It one aspect, the present invention relates to a polarizing element and an optical element that can form a semitransparent or other type of liquid crystal display which is excellent in contrast in a reflective display mode and also is excellent in luminance in a transmissive display mode utilizing a reflective polarizing plate.

DISCLOSURE OF THE INVENTION

In one embodiment, the present invention provides a polarizing element comprising a reflective polarizing plate and an absorptive polarizer, wherein the reflective polarizing plate separates an incident natural light into a reflected light and a transmitted light each comprising a polarized light, and the absorptive polarizer is arranged on one side of the reflective polarizing plate so as to transmit a polarized light comprising the transmitted light.

In one embodiment, in the polarizing element of the present invention, first, it is preferable that the reflective polarizing plate comprises a linearly polarized light separation plate, and the absorptive polarizer comprises an absorptive polarizing plate arranged so that its transmission axis with respect to the transmitted light comprising a linearly polarized light is in parallel with the polarizing direction of the linearly polarized light. In this case, it is preferable that the linearly polarized light separation plate comprises a dielectric multilayer film or a laminate of multiple thin films different in refractive index anisotropy. Furthermore, it is preferable that the linearly polarized light separation plate and the absorptive polarizing plate are fixed with each other through an acrylic adhesive layer.

In one embodiment, in the polarizing element of the present invention, second, it is preferable that the reflective polarizing plate comprises a circularly polarized light separation plate, and the absorptive polarizer comprises a circularly polarizing plate arranged so that its rotating direction with respect to the transmitted light comprising a circularly polarized light is the same as the rotating direction of the circularly polarized light. In this case, it is preferable that the circularly polarized light separation plate comprises an oriented film of a cholesteric liquid crystal polymer or a sheet in which an oriented liquid crystal layer of a cholesteric liquid crystal polymer is supported on a film substrate. Furthermore, it is preferable that the circularly polarized light separation plate and the circularly polarizing plate are fixed with each other through an acrylic adhesive layer.

In this polarizing element, it is preferable that the circularly polarizing plate comprises a quarter wavelength plate and an absorptive polarizing plate. Furthermore, it is preferable that the quarter wavelength plate comprises at least two optical retardation layers. It is also preferable that the quarter wavelength plate comprises a stretched film of a polymer.

In the polarizing element of the present invention, it is preferable that the absorptive polarizing plate comprises a polarizing film obtained by adsorbing iodine and/or dichromatic dye on a hydrophilic polymer film and stretching the hydrophilic polymer film. It is also preferable that a transparent protective layer is formed on one or both sides of the polarizing film.

Next, the present invention provides an optical element comprising the above-described polarizing element of the present invention; and (a) a quarter wavelength plate or (b) an absorptive polarizing plate and a quarter wavelength plate arranged on the side of the absorptive polarizer in the polarizing element.

That is, the optical element of the present invention comprises a polarizing element comprising a reflective polarizing plate and an absorptive polarizer, wherein the reflective polarizing plate separates an incident natural light into a reflected light and a transmitted light each comprising a polarized light, and the absorptive polarizer is arranged on one side of the reflective polarizing plate so as to transmit a polarized light comprising the transmitted light; and (a) a quarter wavelength plate or (b) an absorptive polarizing plate and a quarter wavelength plate arranged on the side of the absorptive polarizer in the polarizing element, wherein the absorptive polarizing plate has an axial relation so as to transmit a polarized light transmitted through the absorptive polarizer.

In the optical element of the present invention, it is preferable to use a polarizing element in which the reflective polarizing plate comprises a linearly polarized light separation plate, and the absorptive polarizer comprises an absorptive polarizing plate arranged so that its transmission axis with respect to the transmitted light comprising a linearly polarized light is in parallel with the polarizing direction of the linearly polarized light.

In the optical element of the present invention, it is also preferable to use a polarizing element in which the reflective polarizing plate comprises a circularly polarized light separation plate, and the absorptive polarizer comprises a circularly polarizing plate arranged so that its rotating direction with respect to the transmitted light comprising a circularly polarized light is the same as the rotating direction of the circularly polarized light. It is preferable that the circularly polarizing plate comprises a quarter wavelength plate and an absorptive polarizing plate.

In the optical element of the present invention, it is preferable that the reflective polarizing plate, the absorptive polarizer, and (a) the quarter wavelength plate or (b) the absorptive polarizing plate and the quarter wavelength plate are fixed with one another through an acrylic adhesive layer.

Furthermore, the present invention provides a semitransparent liquid crystal display comprising a liquid crystal cell and the above-described polarizing element or optical element of the present invention, the polarizing element or the optical element being arranged on at least one side of the liquid crystal cell.

According to the present invention, the function as a semitransparent reflective polarizer is accomplished utilizing the reflective polarizing plate. In a transmissive display mode, the polarization ratio through the absorptive polarizer is maintained, and a high contrast display can be achieved due to the high polarization ratio. Also, high luminance display can be achieved by the high utilization of a lighting light due to a high light transmittance. In a reflective display mode, the optical element absorbs and cuts off efficiently unnecessary reflected light (returned light), which is an external light reflected by a lighting device etc., so that reduced contrast in a black display etc. is prevented, and good display quality with high contrast is provided.

BRIEF DESCRIPTION OF THE DRAWINGS

FIG. 5 is a sectional view of an optical element in accordance with one embodiment of the present invention.

FIG. 6 is a sectional view of an optical element in accordance with one embodiment of the present invention.

DESCRIPTION OF THE PREFERRED EMBODIMENTS

A polarizing element of the present invention comprises a reflective polarizing plate and an absorptive polarizer, wherein the reflective polarizing plate separates an incident natural light into a reflected light and a transmitted light each comprising a polarized light, and the absorptive polarizer is arranged on one side of the reflective polarizing plate so as to transmit a polarized light comprising the transmitted light. An optical element of the present invention comprises the above-described polarizing element of the present invention; and a quarter wavelength plate or an absorptive polarizing plate and a quarter wavelength plate arranged on the side of the absorptive polarizer in the polarizing element, wherein the absorptive polarizing plate has an axial relation so as to transmit a polarized light transmitted through the absorptive polarizer.

Figure 1:
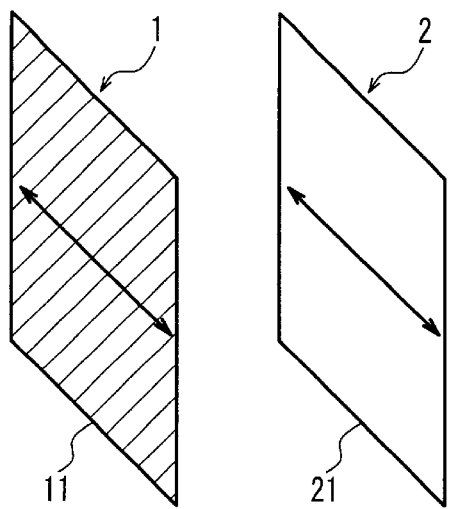
FIG. 1 shows a configuration of a polarizing element in accordance with one embodiment of the present invention.
Figure 2:
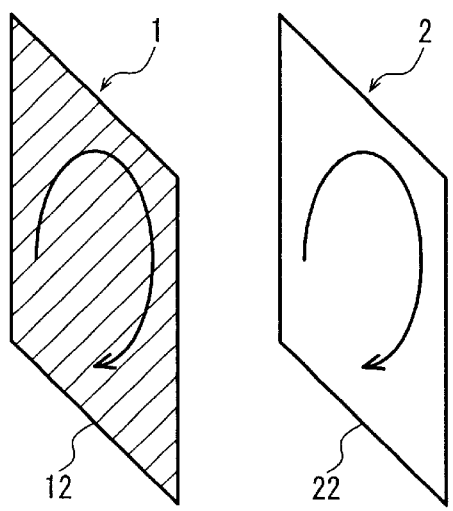
FIG. 2 shows a configuration of a polarizing element in accordance with one embodiment of the present invention.

FIGS. 1 and 2 show examples of the above-described polarizing element; and FIGS. 3 to 6 show examples of the above-described optical element. Numeral 1 denotes a reflective polarizing plate; numeral 11 or 12 denotes a linearly polarized light separation plate or a circularly polarized light separation plate forming the reflective polarizing plate 1; numeral 2 is denotes an absorptive polarizer; and numeral 21 or 22 denotes an absorptive polarizing plate or a circularly polarizing plate comprising a quarter wavelength plate 23 and an absorptive polarizing plate 24 forming the absorptive polarizer 2. Numeral 3 denotes a quarter wavelength plate, and numeral 4 denotes an absorptive polarizing plate. Numeral 5 denotes a lighting device.

As illustrated in the drawings, a polarizing element is formed by arranging an absorptive polarizer on one side of a reflective polarizing plate that separates an incident natural light into a reflected light and a transmitted light each comprising a polarized light, so that the absorptive polarizer transmits a polarized light comprising the transmitted light. That is, when the reflective polarizing plate comprises a linearly polarized light separation plate, an absorptive polarizing plate is used as the absorptive polarizer, and an absorptive polarizing plate 21 is arranged so that its transmission axis is in parallel with the polarizing direction of a linearly polarized light transmitted through a linearly polarized light separation plate 11 as illustrated by arrows in FIG. 1.

When the reflective polarizing plate comprises a circularly polarized light separation plate, a circularly polarizing plate comprising a quarter wavelength plate and an absorptive polarizing plate is used as the absorptive polarizer, and a circularly polarizing plate 22 is arranged so that its rotating direction with respect to a circularly polarized light transmitted through the circularly polarized light separation plate 12 is the same as the rotating direction of a circularly polarized light as illustrated by arrows in FIG. 2. Accordingly, a light transmitted through the absorptive polarizer, such as a lighting light, is transmitted through the reflective polarizing plate efficiently.

On the other hand, an optical element is brined by arranging a quarter wavelength plate or an absorptive polarizing plate and a quarter wavelength plate on the side of the absorptive polarizer in the above-described polarizing element. For example, the optical element illustrated in FIG. 3 comprises a polarizing element comprising a linearly polarized light separation plate 11 and an absorptive polarizing plate 21, and a quarter wavelength plate 3 arranged on the side of the absorptive polarizing plate, i.e., arranged on the side of the absorptive polarizing plate opposed to the light separation plate, in the polarizing element.

Figure 4:
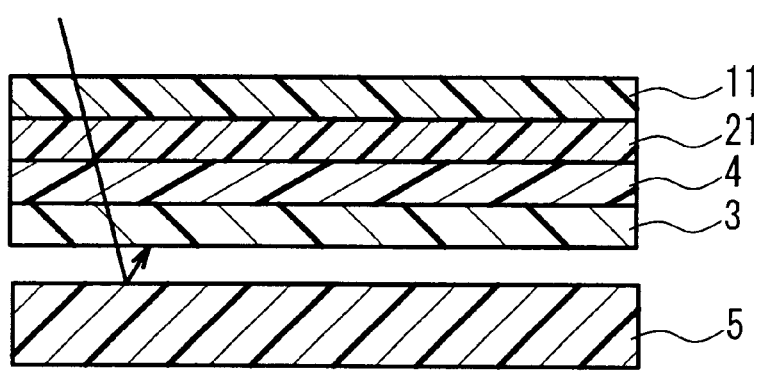
FIG. 4 is a sectional view of an optical element in accordance with one embodiment of the present invention.

The optical element illustrated in FIG. 4 comprises the above-described polarizing element, and an absorptive polarizing plate 4 and a quarter wavelength plate 3 arranged in this order on the side of the absorptive polarizing plate 21 in the polarizing element, i.e., arranged on the side of the absorptive polarizing plate 21 opposed to the light separation plate. The absorptive polarizing plate 4 is arranged so that it has an axial relation to transmit a polarized light transmitted through the absorptive polarizer, in other words, so that its transmission axis is in parallel with the transmission axis of the upper absorptive polarizing plate 21.

The optical element illustrated in FIG. 5 comprises a polarizing element comprising a circularly polarized light separation plate 12, a quarter wavelength plate 23 and an absorptive polarizing plate 24 arranged in this order, and a quarter wavelength plate 3 arranged on the side of the absorptive polarizing plate 24 (i.e. on the side of a circularly polarizing plate 22) in the polarizing element, i.e., arranged on the side of the absorptive polarizing plate 24 opposed to the light separation plate. Furthermore, the optical element illustrated in FIG. 6 comprises the above-mentioned polarizing element, and an absorptive polarizing plate 4 and a quarter wavelength plate 3 arranged in this order on the side of the absorptive polarizing plate 24 in the polarizing element, i.e., arranged on the side of the absorptive polarizing plate 24 opposed to the light separation plate. The absorptive polarizing plate 4 is arranged so that it has an axial relation to transmit a polarized light transmitted through the absorptive polarizer, in other words, so that its transmission axis is in parallel with the transmission axis of the upper absorptive polarizing plate 24.

In the above, as illustrated by arrows in FIGS. 3 to 6, when a light transmitted through an optical element is reflected by the lighting device 5 etc. on the lower side and enters the optical element again as returned light to reach the absorptive polarizing plates 4, 21 and 24, the polarizing direction of the returned light corresponds to the absorption axes of the absorptive polarizing plates, and the returned light is absorbed and cut off. Thus, overlapping of returned light with display light resulting in reduced contrast is prevented. At the same time, a light from the lighting device transmitted through the quarter wavelength plate 3 and the absorptive polarizing plate 4 is transmitted through the polarizing element efficiently.

In the above, as the reflective polarizing plate, any suitable reflective polarizing plate may be used having such characteristics to reflect a linearly polarized light with a specific polarizing direction or a circularly polarized light with a specific direction and transmit other light when natural light enters. Examples of such a reflective polarizing plate include a linearly polarized light separation plate having such characteristics to transmit a linearly polarized light with a specific polarizing direction and reflect other light, such as a dielectric multilayer thin film and a laminate of multiple thin films different in refractive index anisotropy; and a circularly polarized light separation plate having such characteristics to reflect a circularly polarized light of either right or left direction and transmit other light, such as a cholesteric liquid crystal layer, particularly an oriented film of a cholesteric liquid crystal polymer or an oriented liquid crystal layer of a cholesteric liquid crystal polymer supported on a film substrate.

The circularly polarized light separation plate may have such characteristics to reflect and transmit a circularly polarized light in a broad wavelength region, e.g. visible light region, by having a configuration in which two or at least three cholesteric liquid crystal layers having different reflection wavelengths are laminated.

The type of the absorptive polarizing plate is not particularly limited, any suitable absorptive polarizing plate that transmits a linearly polarized light with a specific polarizing direction and absorbs other light may be used. Examples of such an absorptive polarizing plate include polarizing films obtained by adsorbing iodine and/or a dichromatic dye on a hydrophilic polymer film such as a poly(vinyl alcohol) based film, a partially formalized poly(vinyl alcohol) based film, or an ethylene-vinyl acetate copolymer-based partially saponified film, and stretching the film; and polarizing films obtained by orienting a polyene such as dehydrated poly(vinyl alcohol) or dehydrochlorinated poly(vinyl chloride).

Furthermore, the polarizing plate may comprises the above-described polarizing film and a transparent protective layer formed on one or both sides of the polarizing film for the purpose of increasing water resistance, protection such as reinforcement, etc. In the formation of the transparent protective layer, preferably, a polymer excellent in transparency, mechanical strength, thermal stability, water-shielding property, etc. is used.

Examples of the above-mentioned polymer include cellulose-based polymers such as cellulose diacetate and cellulose triacetate, polyester-based polymers such as poly(ethylene terephthalate) and poly(ethylene naphthalate), poly(ether sulfone), polycarbonate, polyamides, polyimides, polyolefins, acrylic resins, and thermosetting or ultraviolet curing resins based on acrylic, urethane, acrylic urethane, epoxy, silicone, etc. The transparent protective layer may be formed by a suitable method, for example, coating of a polymer solution or adhesive lamination of a film.

In the above, any suitable plate may be used as the quarter wavelength plate in combination with an absorptive polarizing plate to form a circularly polarizing plate. A quarter wavelength plate that functions in a broad wavelength range such as visible light range can be obtained, for example, by laminating an optical retardation layer that functions as a quarter wavelength plate with respect to a monochromatic light, e.g. 550 nm wavelength light, with an optical retardation layer that exhibits other optical retardation characteristic (e.g. an optical retardation layer that functions as a half wavelength plate). Therefore, the quarter wavelength plate may comprise one or at least two optical retardation layers.

The quarter wavelength plate or the optical retardation layer may be obtained, for example, as a birefringent film comprising a stretched film of various kinds of polymers, an oriented film of a discotic or nematic liquid crystal polymer, or an oriented liquid crystal layer of a discotic or nematic liquid crystal polymer supported on a film substrate.

Examples of the polymer that forms the above-described birefringent film include olefinic polymers such as polyethylene, polypropylene and polyolefins with norbornene structure; polyester-based polymers; acrylic polymers such as poly(methyl methacrylate), cellulose-based polymers, polyamides; polyimides, polysulfones, poly(ether sulfone), poly(ether ether ketone), poly(phenylene sulfide), poly(vinyl alcohol), poly(vinyl chloride), poly(vinyl butyrate), polycarbonate, polystyrene, polyallylate, polyoxymethylene, etc.

The stretched film may be processed by a suitable method such as uniaxial or biaxial. The stretched film may be a birefringent film in which the refractive index in the thickness direction of the film is controlled by applying a shrinking force or/and a stretching force to the film adhered with a heat-shrinkable film. The above-described circularly polarizing plate may be a plate not using a quarter wavelength plate and comprising, for example, a liquid crystal oriented film.

With respect to the quarter wavelength plates and the absorptive polarizing plates used in the formation of an optical element, those exemplified above may be used.

All or part of the formed layers in a polarizing element or an optical element of the present invention, including a reflective polarizing plate such as a linearly polarized light separation plate or a circularly polarized light separation plate, an absorptive polarizer such as an absorptive polarizing plate or a circularly polarizing plate, a quarter wavelength plate, an absorptive polarizing plate, etc. simply may be placed upon one another. It is preferable that these layers are adhered and fixed with one another by a suitable method such as using an adhesive from the aspect of preventing deviation of axial relation or preventing foreign matters from entering between layers.

As the adhesive, any suitable adhesive may be used. For example, adhesive agents using a suitable polymer such as an acrylic polymer, a silicone-based polymer, polyester, polyurethane, polyether, synthetic rubbers, etc. as a base polymer may be used. Among them, preferred are adhesive agents that are excellent in optical transparency, exhibits proper wettability and cohesiveness and also adhesion properties such as adhesiveness, are excellent in weather resistance, heat resistance, etc., and are free from peeling problems such as lifting or separation under heating or humidifying, such as acrylic adhesive agents.

Although not limited, examples of the acrylic adhesive agents include those using, as a base polymer, an acrylic polymer having a weight-average molecular weight of at least 100,000, which is formed by copolymerizing an alkyl ester of (meth)acrylic acid including an alkyl group having not more than 20 carbon atoms, e.g. methyl, ethyl or butyl group, with an acrylic monomer comprising an improved component such as (meth)acrylic acid or hydroxyethyl (meth)acrylate in a combination such that the glass transition temperature of the acrylic polymer formed is not higher than 0° C.

An adhesive layer may be formed on a reflective polarizing plate etc. by a suitable method, for example, by directly applying a solution of an adhesive agent by a suitable expansion method such as flow-expanding or coating, or by forming an adhesive layer on a separator in accordance with the above and removing and adhering the layer. In such a case, the adhesive layer may be formed on one or both sides of the reflective polarizing plate etc. The adhesive layer formed may be a laminate of layers having different compositions or of different types. When forming an adhesive layer on both sides, adhesive layers having different compositions or of different types may be formed on the front and back sides of the reflective polarizing plate etc.

The thickness of the adhesive layer may be determined as appropriate depending on the adhesive strength, etc., and it is generally from 1 to 500 $\mu$m. When an adhesive layer is exposed on the outer surface of a polarizing element or an optical element, it is preferable that the surface of the adhesive layer is covered with a separator or the like to prevent contamination etc. until it is supplied for practical use.

In the above-described polarizing element or optical element, although axial deviation due to a working error, etc. is allowed, it is preferable that the reflective polarizing plate, the absorptive polarizer, etc. are arranged so that their respective axes are in parallel with each other as much as possible from the aspect of light transmittance, absorption loss of reflected light, etc. When the optical axis of the reflective polarizing plate or the like has unevenness, preferably the parallel relation is formed based on its average direction.

The polarizing element and the optical element of the present invention may be used in various applications such as semitransparent or transparent, or reflective liquid crystal displays. Particularly, these elements may be used favorably in the formation of a semitransparent liquid crystal display, which does not need an external light in a reflective display mode, and is required to achieve high contrast by cutting off a reflected light and to attain high luminance by the excellent transmittance of a lighting light in a transmissive display mode.

When forming a semitransparent or transparent liquid crystal display, the polarizing element or the optical element of the present invention is arranged between a liquid crystal cell and a lighting device so that the reflective polarizing plate is on the side of the liquid crystal cell. On the other hand, when forming a reflective liquid crystal display, the polarizing element or the optical element of the present invention is arranged on the visible side of a liquid crystal cell so that the reflective polarizing plate is on the visible side. In this case, unnecessary reflected light of an external light, which is reflected by the surface of the liquid crystal cell, etc. to interfere with the visibility of display light, is absorbed and cut off.

A liquid crystal display can be formed in accordance with a conventional method except for the above-described points. Therefore, the liquid crystal cell used is arbitrary, and various types of liquid crystal displays can be formed using a liquid crystal cell of suitable type, for example, those of active-matrix driving type represented by thin-film transistor type, those of simple-matrix driving type represented by twisted nematic type or super-twisted nematic type, etc. Furthermore, when forming a liquid crystal display, a suitable component such as a prism array sheet, a lens array sheet, a light diffusing plate, a back light, etc. can be arranged at a proper position in one layer or in at least two layers.

EXAMPLE 1

An absorptive polarizing plate (EG1425DU, manufactured by Nitto Denko Corporation; 44% transmittance, 99.5% polarization ratio; the same absorptive polarizing plate being used in the following examples) was adhered onto one side of a linearly polarized light separation plate (DBEF, manufactured by 3M) through an acrylic adhesive layer so that the polarizing direction of a linearly polarized light transmitted through the linearly polarized light separation plate was in parallel with the transmission axis of the absorptive polarizing plate. Thus, a polarizing element was obtained.

The polarizing element exhibited the function as a semitransparent reflective polarizer. It also showed a high polarization ratio of a transmitted light depending on the absorptive polarizing plate, and high contrast display was obtained. Compared with a simple absorptive semitransparent layer having 40% transmittance, the light utilization efficiency of a transmitted light also increased double. With respect to the prevention of decreased contrast in a reflective display mode when a lighting device of electroluminescence system was provided on the back side, the same effect was obtained as that of conventional one having a light-absorbing layer.

EXAMPLE 2

A circularly polarizing plate comprising a broadband quarter wavelength plate (manufactured by Nitto Denko Corporation, a laminate of NRF of 270 nm and 140 nm; the same broadband quarter wavelength plate being used in the following examples) and an absorptive polarizing plate (the same circularly polarizing plate being used in the following examples) was adhered onto one side of a circularly polarized light separation plate, which comprises a cholesteric liquid crystal, through an acrylic adhesive layer so that the rotating direction of the circularly polarizing plate was the same as the rotating direction of a circularly polarized light transmitted through the circularly polarized light separation plate. Thus, a polarizing element was obtained.

The polarizing element exhibited the function as a semitransparent reflective polarizer. It also showed a high polarizing ratio of a transmitted light depending on the absorptive polarizing plate, and high contrast display was obtained. Compared with a simple absorptive semitransparent layer having 40% transmittance, the light utilization efficiency of a transmitted light also increased double. With respect to the prevention of decreased contrast in a reflective display mode when a lighting device of electroluminescence system was provided on the back side, the same effect was obtained as that of conventional one having a light-absorbing layer.

EXAMPLE 3

A circularly polarizing plate was adhered onto the side of the absorptive polarizing plate in the polarizing element of Example 1 through an acrylic adhesive layer so that the absorptive polarizing plates were adjacent with each other and their transmission axes were in parallel with each other.

Thus, an optical element was obtained (FIG. 4). This optical element maintained the function as a semitransparent reflective polarizer. It also showed a high polarizing ratio of a transmitted light depending on the absorptive polarizing plates, and high contrast display was obtained. Compared with a simple absorptive semitransparent layer having 40% transmittance, the light utilization efficiency of a transmitted light also increased double.

With respect to the prevention of decreased contrast in a reflective display mode when a lighting device of electroluminescence system was provided on the back side, the same or greater effect was obtained than that of conventional one having a light-absorbing layer, and an equivalent effect was obtained to that of conventional one having a complete light-absorbing layer. The light transmittance was slightly lower than 38%, which is the value when the absorptive polarizing plates are arranged in parallel nicol.

EXAMPLE 4

Figure 3:
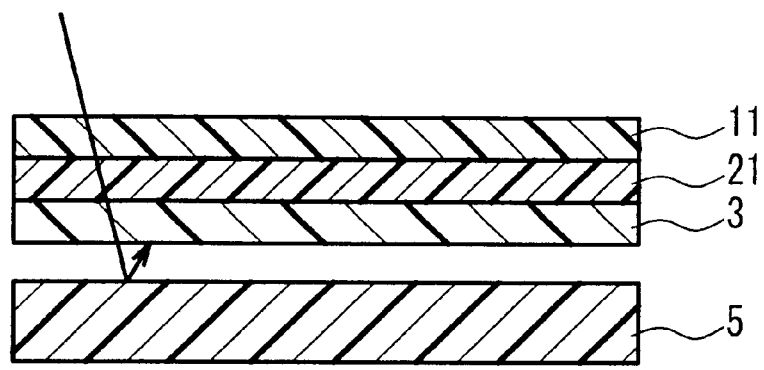
FIG. 3 is a sectional view of an optical element in accordance with one embodiment of the present invention.

A broadband quarter wavelength plate was adhered onto the side of the absorptive polarizing plate in the polarizing element of Example 1 through an acrylic adhesive layer. Thus, an optical element was obtained (FIG. 3). This optical element maintained the function as a semitransparent reflective polarizer. This optical element exhibited excellent light transmittance and thinness. Furthermore, this optical element exhibited a high polarization ratio of a transmitted light depending on the absorptive polarizing plate, and high contrast display was obtained. Compared with a simple absorptive semitransparent layer having 40% transmittance, the light utilization efficiency of a transmitted light also increased double. With respect to the prevention of decreased contrast in a reflective display mode when a lighting device of electroluminescence system was provided on the back side, the same or greater effect was obtained than that of conventional one having a light-absorbing layer, and an equivalent effect was obtained to that of conventional one having a complete light-absorbing layer.

EXAMPLE 5

A circularly polarizing plate was adhered onto the side of the circularly polarizing plate in the polarizing element of Example 2 through an acrylic adhesive layer so that the absorptive polarizing plates were adjacent with each other. Thus, an optical element was obtained (FIG. 6). This optical element maintained the function as a semitransparent reflective polarizer. It also showed a high polarization ratio of a transmitted light depending on the absorptive polarizing plates, and high contrast display was obtained. Compared with a simple absorptive semitransparent layer having 40% transmittance, the light utilization efficiency of a transmitted light also increased double.

With respect to the prevention of decreased contrast in a reflective display mode when a lighting device of electroluminescence system was provided on the back side, the same or greater effect was obtained than that of conventional one having a light-absorbing layer, and an equivalent effect was obtained to that of conventional one having a complete light-absorbing layer. The light transmittance was slightly lower than 38%, which is the value when the absorptive polarizing plates are arranged in parallel nicol.

EXAMPLE 6

A broadband quarter wavelength plate was adhered onto the side of the circularly polarizing plate in the polarizing element of Example 2 through an acrylic adhesive layer. Thus, an optical element was obtained (FIG. 5). This optical element maintained the function as a semitransparent reflective polarizer, and had excellent light transmittance and thinness. Furthermore, this optical element exhibited a high polarization ratio of a transmitted light depending on the absorptive polarizing plates, and high contrast display was obtained. Compared with a simple absorptive semitransparent layer having 40% transmittance, the light utilization efficiency of a transmitted light also increased double. With respect to the prevention of decreased contrast in a reflective display mode when a lighting device of electroluminescence system was provided on the back side, the same or greater effect was obtained than that of conventional one having a light-absorbing layer, and an equivalent effect was obtained to that of conventional one having a complete light-absorbing layer.

COMPARATIVE EXAMPLE

Except that a light-absorbing layer having 40% light transmittance and 60% absorptance was formed in place of the circularly polarizing plate, a polarizing element was obtained in accordance with Example 2. This polarizing element exhibited the function as a semitransparent reflective polarizer, but the contrast in a black display in a reflective display mode when a lighting device of electroluminescence system was provided on the back side was decreased significantly by unnecessary reflected light, so that display quality was not satisfactory.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A display comprising a liquid crystal cell and a polarizing element, the polarizing element comprising a reflective polarizing plate and an absorptive polarizer, wherein the reflective polarizing plate separates an incident natural light into a reflected light and a transmitted light each comprising a polarized light;

the absorptive polarizer is arranged on a side of the reflective polarizing plate opposed to the liquid crystal plate so as to transmit a polarized light comprising the transmitted light, and the absorptive polarizer comprises an absorptive polarizing plate arranged so that a transmission axis of the absorptive polarizer with respect to the transmitted light comprising a linearly polarized light is in parallel with the polarizing direction of the linearly polarized light.

2. The display according to claim 1, wherein the reflective polarizing plate comprises a linearly polarized light separation plate.

3. The display according to claim 2, wherein the linearly polarized light separation plate comprises a dielectric multilayer film.

4. The display according to claim 2, wherein the linearly polarized light separation plate comprises a laminate of multiple thin films different in refractive index anisotropy.

5. The display according to claim 2, wherein the linearly polarized light separation plate and the absorptive polarizing plate are fixed with each other through an acrylic adhesive layer.

6. The display according to claim 1, wherein:

the reflective polarizing plate comprises a circularly polarized light separation plate; and the absorptive polarizer comprises a circularly polarizing plate arranged so that its rotating direction with respect to the transmitted light comprising a circularly polarized light is the same as the rotating direction of the circularly polarized light.

7. The display according to claim 6, wherein the circularly polarized light separation plate comprises an oriented film of a cholesteric liquid crystal polymer.

8. The display according to claim 6, wherein the circularly polarized light separation plate comprises a sheet in which an oriented liquid crystal layer of a cholesteric liquid crystal polymer is supported on a film substrate.

9. The display according to claim 6, wherein the circularly polarized light separation plate and the circularly polarizing plate are fixed with each other through an acrylic adhesive layer.

10. The display according to claim 6, wherein the circularly polarizing plate comprises a quarter wavelength plate and an absorptive polarizing plate.

11. The display according to claim 10, wherein the quarter wavelength plate comprises at least two optical retardation layers.

12. The display according to claim 11, wherein the quarter wavelength plate comprises a stretched film of a polymer.

13. The display according to claim 2 or 10, wherein the absorptive polarizing plate comprises a polarizing film obtained by adsorbing iodine and/or dichromatic dye on a hydrophilic polymer film and stretching the hydrophilic polymer film.

14. The display according to claim 13, wherein a transparent protective layer is formed on one or both sides of the polarizing film.

15. An optical element comprising:

a polarizing element, the polarizing element comprising a reflective polarizing plate and an absorptive polarizer; and (a) a quarter wavelength plate or (b) an absorptive polarizing plate and a quarter wavelength plate, arranged on the side of the absorptive polarizer opposed to the reflective polarizing plate in the polarizing element, wherein the reflective polarizing plate separates an incident natural light into a reflected light and a transmitted light each comprising a polarized light; and the absorptive polarizer is arranged on one side of the reflective polarizing plate so as to transmit a polarized light comprising the transmitted light.

16. The optical element according to claim 15, wherein the absorptive polarizing plate has an axial relation so as to transmit a polarized light transmitted through the absorptive polarizer.

17. The optical element according to claim 15, wherein:

the reflective polarizing plate comprises a linearly polarized light separation plate; and the absorptive polarizer comprises an absorptive polarizing plate arranged so that its transmission axis with respect to the transmitted light comprising a linearly polarized light is in parallel with the polarizing direction of the linearly polarized light.

18. The optical element according to claim 15, wherein:

the reflective polarizing plate comprises a circularly polarized light separation plate; and the absorptive polarizer comprises a circularly polarizing plate arranged so that its rotating direction with respect to the transmitted light comprising a circularly polarized light is the same as the rotating direction of the circularly polarized light.

19. The optical element according to claim 18, wherein the circularly polarizing plate comprises a quarter wavelength plate and an absorptive polarizing plate.

20. The optical element according to claim 15, wherein the reflective polarizing plate, the absorptive polarizer, and (a) the quarter wavelength plate or (b) the absorptive polarizing plate and the quarter wavelength plate are fixed with one another through an acrylic adhesive layer.

21. A semitransparent liquid crystal display, comprising:

a liquid crystal cell; and (A) a polarizing element or (B) an optical element;

(B) the polarizing element comprising a reflective polarizing plate and an absorptive polarizer, and the optical element further comprising (a) a quarter wavelength plate or (b) an absorptive polarizing plate and a quarter wavelength plate, arranged on the side of the absorptive polarizer opposed to the reflective polarizing plate in the polarizing element; and (A) the polarizing element or (B) the optical element being arranged on at least one side of the liquid crystal cell;

wherein the reflective polarizing plate separates an incident natural light into a reflected light and a transmitted light each comprising a polarized light; and the absorptive polarizer is arranged on one side of the reflective polarizing plate so as to transmit a polarized light comprising the transmitted light.

22. The display of claim 1, wherein the display is a semitransparent liquid crystal display.

23. A polarizing element, comprising:

a reflective polarizing plate; and an absorptive polarizer, wherein the reflective polarizing plate separates an incident natural light into a reflected light and a transmitted light each comprising a polarized light;

the absorptive polarizer is arranged on one side of the reflective polarizing plate so as to transmit a polarized light comprising the transmitted light;

the reflective polarizing plate comprises a circularly polarized light separation plate; and the absorptive polarizer comprises a circularly polarizing plate arranged so that its rotating direction with respect to the transmitted light comprising a circularly polarized light is the same as the rotating direction of the circularly polarized light.

24. A semitransparent liquid crystal display comprising the polarizing element of claim 23, wherein the absorptive polarizer is disposed on a side of the reflective polarizing plate opposed to a display side of the display.

25. A semitransparent liquid crystal display comprising the polarizing element of claim 23.

26. A semitransparent liquid crystal display comprising the polarizing element of claim 24.

* * * * *